United States Patent [19]

Windecker

[11] Patent Number: 4,598,555

[45] Date of Patent: Jul. 8, 1986

[54] GAS COOLER

[75] Inventor: Robert J. Windecker, West Palm Beach, Fla.

[73] Assignee: Nhy-temp, Inc., West Palm Beach, Fla.

[21] Appl. No.: 787,634

[22] Filed: Oct. 14, 1985

[51] Int. Cl.$^4$ ............................................. F25D 17/06
[52] U.S. Cl. ......................................... 62/91; 62/239
[58] Field of Search ...................... 62/62, 78, 91, 239

[56] References Cited

U.S. PATENT DOCUMENTS

| | | | |
|---|---|---|---|
| 891,020 | 6/1908 | Voorhees | 62/309 |
| 2,115,344 | 4/1938 | Stacey, Jr. | 62/237 |
| 2,293,316 | 8/1942 | Stebbins | 62/237 |
| 2,336,125 | 12/1943 | Preble | 62/309 |
| 2,791,401 | 5/1957 | Harslem et al. | 62/237 |
| 4,380,910 | 4/1983 | Hood et al. | 62/91 |
| 4,406,131 | 9/1983 | Weasel, Jr. | 62/78 |
| 4,434,623 | 3/1984 | Weasel, Jr. | 62/239 |
| 4,454,723 | 6/1984 | Weasel, Jr. | 62/91 |
| 4,467,612 | 8/1984 | Weasel, Jr. | 62/78 |

Primary Examiner—Ronald C. Capossela
Attorney, Agent, or Firm—Wendell Coffee; Montgomery W. Smith

[57] ABSTRACT

Freshly harvested vegetation is precooled in refrigerated containers by circulating 25,000 cubic feet of chilled air per minute through the container. Conduits formed by pallets on which boxes of the vegetation are stacked distributes the chilled air, which flows through the produce to the top of the refrigerated container. Air is withdrawn from the top of the container and cooled by flowing it past large chilled water film surface area produced by cascading 2,200 gallons of water per minute through a cross fluted PVC surface media block. A drift eliminator removes water droplets that might damage vegetation or cardboard boxes from the chilled air exiting the surface media block. A radial fan recirculates the rechilled air to the conduits below the pallets. A false door is movably mounted to fluidly connect the air flow at appropriate positions on the container.

17 Claims, 6 Drawing Figures

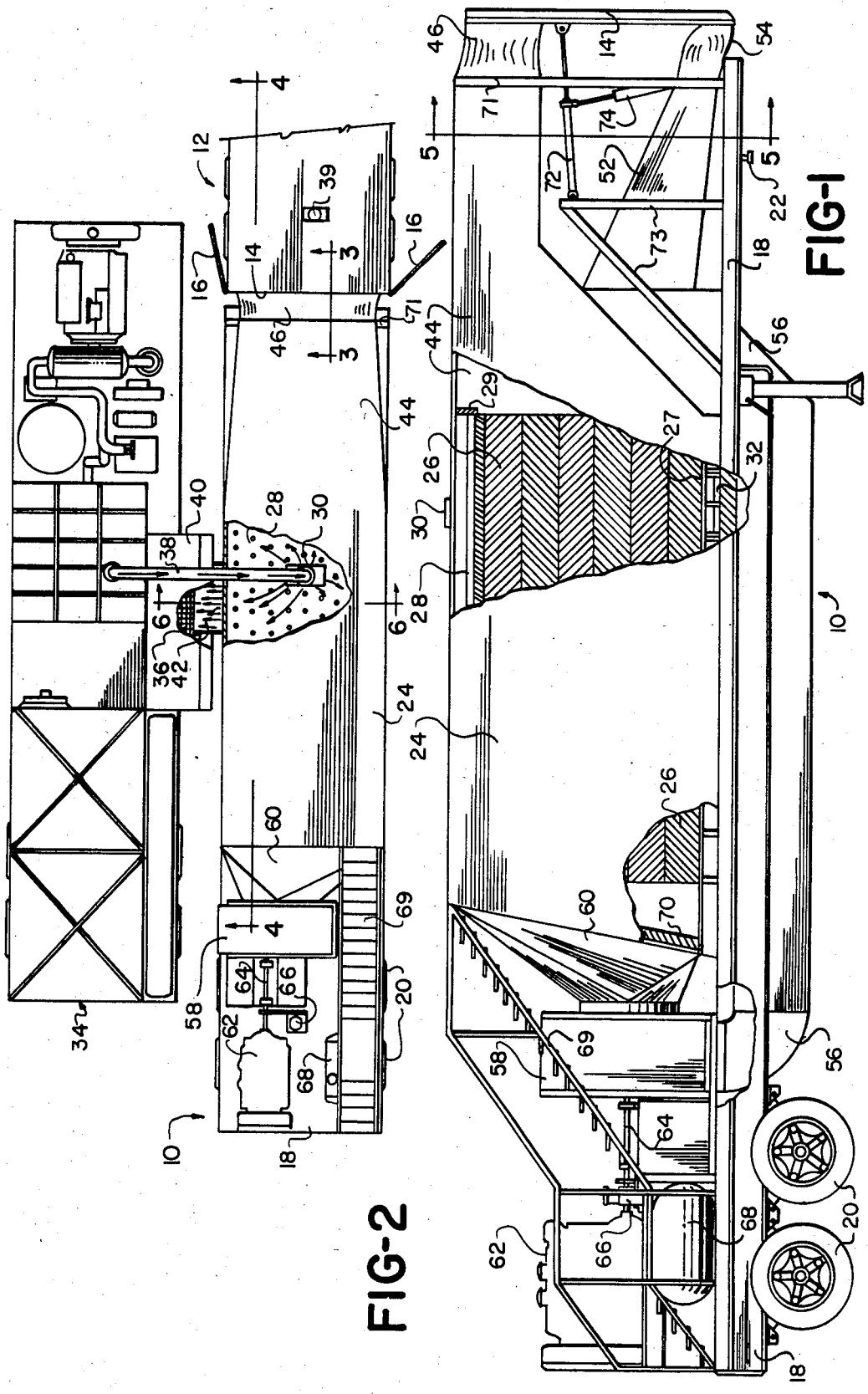

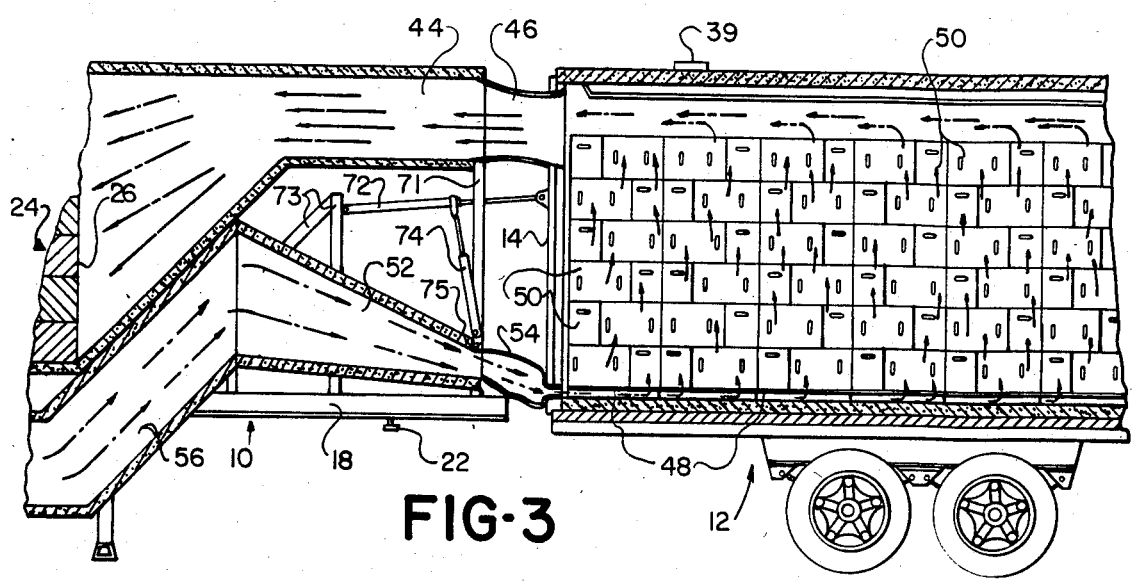
FIG-3
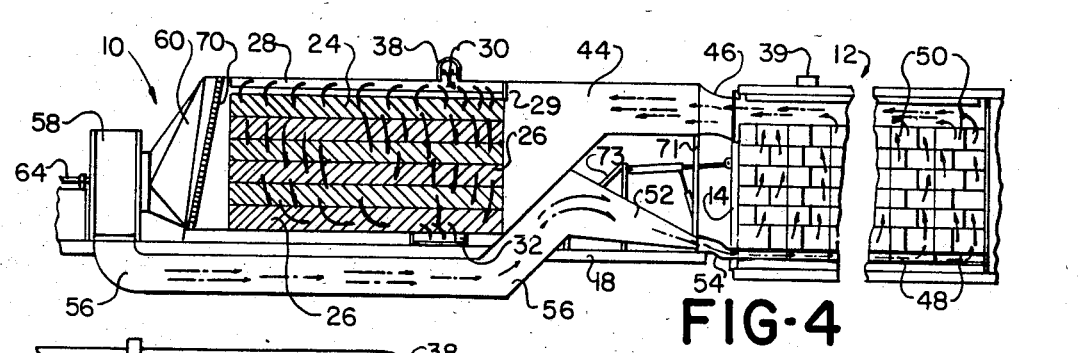
FIG-4
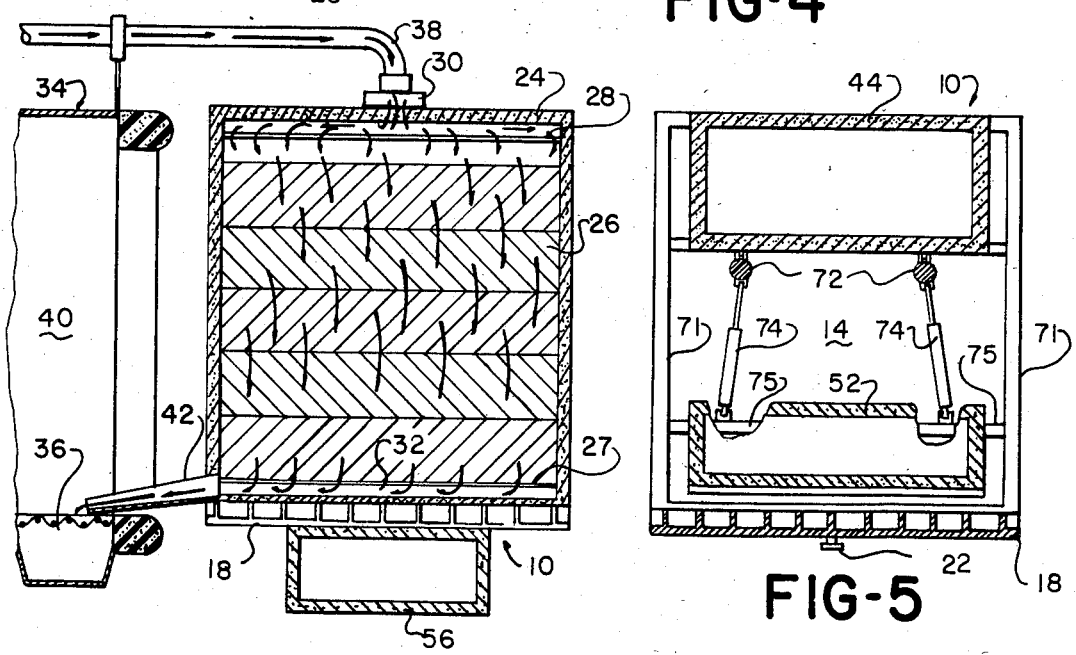
FIG-6
FIG-5

GAS COOLER

CROSS REFERENCE TO RELATED APPLICATIONS

None. However, applicant filed Disclosure Document Ser. No. 139,986 on July 29, 1985, which document concerns this application; therefore, by separate paper it is respectfully requested that the document be retained and acknowledgment thereof made by the Examiner. (MoPEP 1706)

BACKGROUND OF THE INVENTION

(1) Field of the Invention

This invention relates to cooling vegetation in a refrigerated transport container. Applicant designates one with ordinary skill in the art to be a mechanical engineer or other person familiar with refrigerated transportation of vegetation.

(2) Description of the Prior Art

It is important to cool produce as soon after harvest as possible. The longer the produce is allowed to sit in ambient temperatures, the shorter is the shelf life. Even if boxes of produce are loaded in a shipping container immediately after harvesting, the refrigeration system of the container will still take an unacceptable amount of time to cool the produce down to the desired temperature.

Before this invention, fresh harvested produce, such as radishes, in refrigerated trailers was precooled using a chilled water flood. Pipes inserted through the container door flooded the trailer with water. An alternative structure and method for hydrocooling is shown in U.S. Pat. No. 4,434,623 issued Mar. 6, 1984.

However, there is certain vegetation that will not withstand precooling with water. A few examples of such commodities are sweet peppers, which can fill with water if hydrocooled; green beans, which become susceptible to fungus is wetted; strawberries, which become soft and watery if hydrocooled; and grapes, which if wetted can develop stem rot.

Some produce is also subject to damage if it is cooled below a recommended storage temperature. Sweet corn and strawberries have a United States Department of Agriculture (USDA) recommended storage temperature of not less than 32° F. to 33° F. Green peppers have a USDA recommended temperature of not less than 40° F.

As used herein, the term "standard recommended storage temperature" shall refer to the minimum recommended temperature for storage and transport of vegetation established by the United States Department of Agriculture, or, where a government standard is lacking, the standard recognized or established by the trade association or trade group dealing with that vegetation commodity. Those with ordinary skill in the storage and transport of such commodities will be familiar with such standard recommended storage temperatures.

Additionally, vegetation packed in cardboard boxes cannot withstand hydrocooling since the flushing of water onto the cardboard boxes will result in their disintegration.

Before filing this application, a search in the United States Patent and Trademark Office by a skilled searcher was performed, which developed the following United States patents:

VOORHEES, U.S. Pat. No. 891,020
STACEY, U.S. Pat. No. 2,115,344
STEBBINS, U.S. Pat. No. 2,293,316
PREBLE, U.S. Pat. No. 2,336,125
HARSLEM ET AL U.S. Pat. No. 2,791,401

PREBLE and STEBBINS both deal with the cooling of railcars. STEBBINS also shows cooling a truck cargo bed. PREBLE is particularly concerned with cargos of vegatable products. PREBLE AND STEBBINS disclose ducts connecting an air cooling apparatus with the interior of the railcar for fan-forced recirculation of air therebetween. PREBLE uses a false door to seal the railcar door.

STEBBINS uses refrigeration elements positioned in the air cooling apparatus to cool return air, and therefore uses substantially dry air. PREBLE also uses cooling coils to extract heat from the recirculated air. PREBLE, however, discloses a sprinkler at the return air opening in the false door for air flow into the railcar, and thus uses air with water droplets.

STACEY and HARSLEM ET AL each show fan forced recirculation of air past blocks of ice for cooling. In STACEY, water from a sump in which ice sits is circulated through a tube type heat exchanger and then sprayed on the ice to drip back down to the sump. The return air flow is through the spray around the water covered ice, past the tubes of the heat exchanger, and into the railcar.

VOORHEES shows cooling by circulation past trays of water.

The following United States applications were applied for by the applicant of this application, and are owned by Nhy-temp, Inc., the assignee of this application:

United States Patent Applications

Ser. No. 542,979, Windecker, Oct. 18, 1983
Ser. No. 543,059, Windecker, Oct. 18, 1983

The following patents dealing with refrigerated vegetation transport are also owned by Nhy-temp, Inc.:

United States Patents

U.S. Pat. No. 4,406,131, Weasel, Jr., Sept. 27, 1983
U.S. Pat. No. 4,434,623, Weasel, Jr., Mar. 6, 1984
U.S. Pat. No. 4,454,723, Weasel Jr., June 19, 1984
U.S. Pat. No. 4,467,612, Weasel, Jr., Aug. 28, 1984

These applications are not prior art to applicant, and the cited applications and patents are not believed to be particularly pertinent. The references cited during the prosecution of these applications and patents are likewise not believed to be particularly relevant to the examination of this application. However, because these references deal with the preferred refrigerated transport structure and method for use in connection with the gas precooling method and structure of this application, and because applicant is familiar with the prosecution of these applications and patents and the art of record therein, they are brought to the attention of the Examiner in the event that they might be deemed to be relevant and pertinent despite applicant's belief to the contrary.

SUMMARY OF THE INVENTION

(1) New Function and Surprising Results

I have invented a gas cooling apparatus for quickly cooling vegetation in a transport container.

I use the term "vegetation" to include a wide variety of plant material. It will be understood, that fresh produce, such as vegetables or fruit, for example sweet peppers, green beans, and strawberries, are still "live". The fact that the produce has been severed from the remainder of the plant in the harvesting process, does not mean that it is no longer alive. The same is true of fresh flowers and complete plants, such a "potted" plants. Although transportation of vegetation primarily concerns fresh produce, this patent application is not limited to green beans, sweet peppers, and the like.

The term "transport containers" is intended to have a wider definition than merely a trailer which is pulled along a highway by a truck or tractor. The other common container in commercial use today is a box which may be carried by many means, for example, on the flatbed of a trailer, railcar, or ship.

Hydrocooling, as described above, quickly cools vegetation in the transport container to the recommended storage temperature. A gas cooler that performs as closely to the hydrocooler operation as feasible is needed to precool vegetation that cannot be subjected to a water bath. A hydrocooler functions well to quickly precool vegetation because heat transfer from the vegetation to chilled water cascaded over the vegetation is reasonably good. However, heat transfer from vegetation to surrounding gases is comparatively poor.

I have determined that in order to quickly cool vegetation in a transport container to a desired container temperature with a chilled gas, the gas flow rate, must be very large so that the container gas is exchanged several times per minute.

The transport container preferably used in practicing my invention is a nitrogen refrigerated trailer having a volume of about 2,200 cubic feet. The preferred air flow rate changes the air in the trailer ten or more times per minute, or for the preferred container, a preferred air flow rate of 25,000 cubic feet per minute.

This flow rate greatly exceeds that practiced in the prior art for cooling rail cars or other produce transport containers. Such flow rate also presents heat exchange problems of enormous difficulty in the gas cooler if more than 25,000 cubic feet per minute of heated air is to be recooled close to, or all the way to, the desired container temperature, usually near freezing, in six seconds.

I prefer to flow the recirculated air through a chilled water cascade to recool air flowed back into the transport container. To facilitate heat exchange from the air to the water, I prefer to use a block of surface media to provide an extremely large surface area of water past which the recirculated air is flowed. The greater the surface area of the water, the greater the air water contact and the greater the heat exchange.

I have found that for an air flow rate of more than 25,000 cubic feet per minute, a stack of cross fluted, polyvinyl chloride (PVC), surface media layers forming a block having a volume of about 600 cubic feet will distribute chilled water / flowed at 2,200 gallons per minute in a film over about 20,000 square feet of surface area. I prefer to use a hydrocooler for a supply of chilled water to be recirculated through the surface media block that is similar to the hydrocooler disclosed in U.S. Pat. No. 4,434,623 referenced above.

In order to prevent adverse effects on the cardboard shipping containers and to avoid collection of water droplets on the vegetation, I prefer to include a drift eliminator downstream of the surface media to collect and remove water droplets from the flowed air.

My invention also utilizes a false door for connecting the ducts leading from the fan and the heat exchanger to the container. With the shipping container positioned with its opening proximate the false door, the false door is aligned by extending and retracting pneumatic cylinders that movably mount the door on the trailer frame. The false door is mated with the opening to obtain a substantially air tight seal.

Thus, the false door, the fan forced air circulation system, the high water and air flow rates, water chilled to the recommended storage temperature, the large water film surface area created by the surface media, and mobility of the cooler all combine to produce the surprising result of quickly and efficiently precooling vegetation in transport containers close to the harvest site.

Thus it may be seen that the total function of my invention far exceeds the sum of the functions of the individual parts such as fans, ducts, etc.

(2) Objects of this Invention

An object of this invention is the precooling of vegetation in transport containers.

Further objects are to achieve the above with a device that is sturdy, compact, durable, relatively lightweight, simple, safe, efficient, versatile, ecologically compatible, energy conserving, and reliable, yet inexpensive and easy to manufacture, transport, hookup, adjust, operate and maintain.

Other objects are to achieve the above with a method that is versatile, ecologically compatible, energy conserving, rapid, efficient, and inexpensive, and does not require highly skilled people to transport, hookup, adjust, operate, and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWING

FIG. 1 is a side elevation view of a gas cooler according to my invention connected to a refrigerated transport container with parts broken away to show internal detail.

FIG. 2 is a top plan view showing the gas cooler and container of FIG. 1, and water flow from and to a hydrocooler connected to the gas cooler.

FIG. 3 is a section view taken substantially along line 3—3 of FIG. 2, showing the false door structure and gas flow through the transport container.

FIG. 4 is a section view taken substantially along line 4—4 of FIG. 2, showing gas and water flow through the gas cooler and transport container.

FIG. 5 is a section view taken substantially along line 5—5 of FIG. 1.

FIG. 6 is a section view taken substantially along line 6—6 of FIG. 2 showing water recirculation between the hydrocooler and gas cooler.

DESCRIPTION OF THE PREFERRED EMBODIMENT(S)

Referring to FIG. 2, the gas cooler 10 is coupled to refrigerated transport container 12 by false door 14 of the gas cooler 10. The false door 14 is mated with an opening in the container 12 that is normally sealed by true doors 16 associated with, and preferably hinged to the transport container 12 adjacent the opening therein.

The gas cooler 10 is used to precool harvested vegetation in the transport container 12 from ambient temperatures to a desired container temperature that is about the standard recommended storage temperature for the particular type of vegetation in the transport container.

Using the gas cooler 10 is more efficient than simply shutting the doors 16 and turning the container refrigeration system on. In addition to overworking the container refrigeration system, the time ordinarily required to bring the temperature of the vegetation down from ambient temperatures is far in excess of that obtained with my invention.

The gas cooler 10 is preferably mobile or transportable to permit it to be located close to harvest sites. Therefore, I prefer to mount the cooling apparatus of the gas cooler 10 on frame 18 in the form of a flat bed trailer having road wheels 20 at a rear of the frame 18. Fifth wheel 22 at a front of the frame 18 is conveniently positioned for coupling the gas cooler with a towing vehicle or tractor (not shown). Of course the frame 18 has the necessary brakes, safety equipment, running lights, and the like required to transport the gas cooler 10 on the public highways.

The gas cooler 10 is preferably positioned convenient to the harvest site to reduce the time the harvested produce or vegetation is kept at ambient temperatures. Thus, for example, after green peppers are harvested, they are packed in cardboard boxes and immediately loaded into the refrigerated transport container 12. As soon as the container 12 is positioned with the true doors 16 open and the opening opposite the false door 14, the false door 14 is aligned with the opening and extended to the container 12 to cover and seal the opening. The cooling process, described in detail below, is then instituted.

After precooling to the desired container temperature, the false door is removed, and the true doors quickly closed to seal the opening and minimize the introduction of heat into the container 12. The container refrigeration unit or system (not shown), forms integral container refrigeration means for maintaining a desired container temperature within the transport container that is at least the standard recommended storage temperature for the vegetation commodity in the transport container 12. I prefer to use the nitrogen cooled transport container described in the patents and applications referenced above in the description of the prior art section above.

When using the term "at least" to refer to a reference temperature, it is meant that the actual temperature of the vegetation, transport container, or chilled water is not less than the referenced temperature. For example, if the standard recommended storage temperature is 33° F., the desired container temperature and the water chill temperature are not less than 33° F., or in other words, "at least" 33° F., or in still other words, 33° F. or above.

Referring to FIG. 1, heat exchange chamber 24 is mounted about mediate the frame 18. The chamber 24 is large and preferably somewhat block shaped, extending the width of the flat bed trailer, and about the height of a transport container trailer, as shown in FIGS. 3 and 4. The chamber encloses a block of surface media, or surface media block 26. The surface media block is spaced slightly above a floor of the chamber 24 by rack 27 and extends substantially the length and width of the chamber 24.

Distribution means in the form of distribution pan 28 within the chamber 24 above the surface media block 26, provides for distributing water evenly onto the top of the surface media block. The distribution pan 28 is preferably is mounted at the top of the chamber 24, and has perforations therein spaced coextensively with the top of the surface media block 26. Water inlet 30 is located at the top of the chamber 24 thereof. The water inlet provides for connection of a source of chilled water to the distribution pan 28.

The ends of the block 26 occupy the cross-sections at the ends of the chamber 24 so that any gas flow through the chamber 24 will pass through the surface media block 26. If necessary, baffles, such as baffle 29, covering the opening between the distribution pan 28 and the block 26, may be used to insure that there are no gas short circuits around the surface media block 26. The particular form of the surface media block preferred will be described in more detail later.

When chilled water is flowed into the distribution pan 28, water sprinkles from the perforations evenly over the top of the surface media block 26. As the water cascades in film layers within the surface media block 26, gas flow through the media block 26 will be exposed to film layers of water flowed over the greatly increased or extensive surface area of the block 26, thereby greatly enhancing heat exchange between the water and gas. After the water exits the bottom of the block 26, it drains to water drain 32 at the chamber 24 floor.

Although any source of chilled water could be used, I prefer to utilize a hydrocooling unit 34 as described in U.S. Pat. No. 4,434,623, referenced above. The hydrocooling unit 34 is also mobile or transportable and is specifically designed to provide the high flow rates of chilled water, at a desired water chilled temperature down to about 33° F., required for the operation of this preferred gas cooler embodiment.

Referring to FIGS. 2 and 6, the hydrocooling unit 34 includes water return trough 36 and water supply pipe 38. The water return trough 36 is within an alcove 40. As shown in the U.S. Pat. No. 4,434,623 for hydrocooling produce in the container 12, the water supply pipe 38 is connected to water inlet 39 on the refrigerated transport container 12, (FIG. 3), and the container opening is sealed against the alcove. The true doors 16 open inside the alcove, and water flowed from the water supply pipe 38 into the container 12 through the water inlet 39 cascades over the produce, and drains out the container 12 opening into the trough 36 in the alcove 40.

For use as a chilled water source according to my invention with the gas cooler 10, the hydrocooling unit 34 is placed so that the alcove 40 is beside the gas cooler with the water return trough 36 positioned below drain outlet 42 of the water drain 32. Water flowed from the water supply pipe 38, through the water inlet 30, and into the distribution pan 28 cascades through the surface media block 26, drains into the water drain 32, and then dumps into the water return trough 36. The hydrocooling unit rechills or rerefrigerates the recycled water to a selected water chill temperature not lower than the desired container temperature, which may be down to about 33° F., and recirculates the rechilled water through the water supply pipe 38 to the water inlet 30. Of course, all of the hydrocooler water refrigeration means for chilling the water, and other structure of the hydrocooling unit 34 not specifically described herein, are fully described in the disclosure of U.S. Pat. No. 4,434,623 cited above.

Gas return plenum 44 extends forward from the chamber 24 to proximate the frame 18 front. Flexible return duct 46 fluidly connects the chamber 12 through the plenum 44 to a return port, opening, or slit in the false door 14. The gas return plenum 44 and the return duct 46 together form a return conduit fluidly connecting the heat exchange chamber to the return port, and through the return port, to the transport container 12 interior.

The false door 14 also has an inlet port, opening, or slit spaced as close to the bottom of the false door as feasible. The inlet opening in the false door 14 is preferably fluidly connected to one end of inlet plenum 52 by flexible inlet duct 54. The other end of the inlet plenum 52 is fluidly connected to one end of fan duct 56.

The fan duct 56 is fluidly connected at another end to an exhaust opening of fan 58 located on the frame 18 rearward of the chamber 24. The fan duct 56, inlet plenum 52, and flexible inlet duct 54 form a fan or inlet conduit fluidly connecting the exhaust of the fan 58 to the inlet port of the false door 14, and through the inlet port, to the transport container 12 interior.

The plenums 44 and 52 may be seen to fluidly connect the wide short ports in the false door 14 to the somewhat square cross-sectioned heat exchange chamber or fan duct. The fan duct 54 extends from proximate the front of the trailer beneath the return plenum 44, and then below the chamber 14 to the bottom of the fan 58, where the exhaust opening of the fan is located.

The intake of the fan 58 is fluidly connected to the rear of the chamber 24, opposite the return plenum 44, by fan shroud 60. Because this is a radial fan, the exhaust opening thereof is somewhat offset from the center of the fan 58. Therefore the fan is preferably positioned on one side of the frame 18 so as to allow the positioning of the fan duct 56 centrally along the frame 18, and a central connection of the fan duct 56 to the inlet plenum 52.

I prefer to use a radial type fan manufactured by Hartzell which circulates approximately 25,000 cubic feet per minute. With the configuration shown in the drawings and the Hartzell 36-BC class 3 radial fan, the gas or air flow produced at the inlet opening in the false door 14 has been measured at about 100 miles per hour on my experimental gas cooler. To power the fan, I prefer to use a model 3-71, 70 hp output, Detroit diesel engine or motor 62 mounted on the frame 18 rear and operatively connected to the fan 58 by driveshaft 64. Fuel tank 68 containing diesel fuel for the engine 62 is located on the frame 18 at the rear thereof, adjacent the engine 62 for convenient hookup by fuel lines fluidly connecting the tank 68 and the motor 62.

I prefer to provide stairs 69 for convenient access to the top of the chamber 24 and the water inlet 30 by persons connecting the water supply pipe 38 of the hydrocooler 34.

I also prefer to connect a belt and pulley to the driveshaft 64 for operatively connecting the diesel engine 62 and the fan 58 to drive compressor 66. The compressor 66 provides compressed air to the pneumatic cylinders used to move the false door 14 into position as described later.

Referring to FIGS. 2 and 4, I also prefer to use drift eliminator 70 between the surface media block 26 and the fan 58 to remove water particles or droplets larger than about 5 microns from the gas stream going to the transport container 12. As described above, water droplets could damage the cardboard boxes 50 in which the vegetation is packed.

I prefer to utilize the surface media PLASdek ®, for the surface media block 26. PLASdek ® is the registered trademark of the Munters Corporation of Fort Myers, Fla. PLASdek ® is a polyvinyl chloride (PVC) surface media with a cross fluted design formed by placing corrugated sheets of PVC flat against one another, with the corrugation of adjacent sheets crossed or transverse each other. Layers or blocks of this PLASdek ® are stacked to form a block of surface media. Although referred to by Munters Corporation and other such manufacturers as surface media, the material is also generically referred to as a film type cooling tower filler or packing or padding.

The PLASdek ® resists decay and rot and therefore extends the life of the surface media used. Because of the cross-fluted or honeycomb design and other beneficial features, the PLASdek ® promotes extensive and enhanced heat exchange from the recirculated gas to the chilled water by dispersing the water cascaded therethrough in a film over a large, extensive surface area.

For example, it is estimated that incoming gas or air at 75° F. at 25,000 cubic feet per minute will be cooled to 34° F. as it exits the surface media, given a water flow rate of 2,200 gallons per minute at a water temperature of 33° F. Of course, with the enormous heat exchange capacity of the surface media block and large water flow, as the temperature of the recirculated gas from the container is reduced, the temperature of the gas leaving the surface media will also be reduced even closer to the chilled water temperature.

It is also estimated that the block of surface media 26 provides more than 20,000 square feet of water surface for heat exchange with gas flow through the block 26, all within a block 26 volume of about 680 cubic feet. Figured differently, it is estimated that there is about 29 square feet of water film surface per cubic foot of surface media for the preferred PLASdek ® surface media.

Although I prefer to use the film-type filler in the form of the PLASdek surface media, a splash type filler, or even water spray heat exchange could be used, with significant increases in size of the chamber 14 and much greater water flow rates. The film type heat exchange media is by far more efficient. It will be understood that with my invention, the PLASdek is not used primarily for evaporative cooling, as with cooling towers, but is used almost solely for heat exchange with saturated recirculated gas or air.

I prefer to use a drift eliminator product also manufactured by the Munters Corporation as the drift eliminator 70. The drift eliminator 70 is preferably approximately four inches thick and preferably removes water droplets larger than about five microns. Such drift eliminators are widely used on cooling towers to prevent drifting of water or other coolant droplets onto cars in parking lots, or other property, near the cooling towers.

The false door 14 is preferably mounted on the frame 18 for vertical and horizontal movement by pairs of pneumatic cylinders 72 and 74. The false door 14 is shaped to cover the and seal the opening of the transport container 12.

The forward ends of the plenums 44 and 52 are supported and braced by front stand 71. The pair of cylinders 72 are pivoted to cylinder stand 73 just forward of the plenum 44, and extend to the false door 14 between the inlet opening and the return opening. The cylinders 74 are pivoted to cross bar 75 extending at the top of the plenum 52 between the vertical members of the stand 71, and extend to the cylinders 72. The cylinders 74 are preferably angled as shown in FIG. 5. Compressed air from the compressor 66 is connected to the pneumatic cylinders 72 and 74 by pneumatic valves (not shown).

The appropriate valves are opened to extend the false door 14 to the opening, to align the door 14 with the container opening, and then to mate or seal the false door over the opening in the container 12. The trailers or containers 12 are usually backed up to the front of the frame 10 with the container opening pretty accurately aligned laterally with the false door 14. The trailer height varies considerably according to load, tire type, and trailer model. Thus the cylinders 74 permit moving the door up or down. The trailers are also sometimes angled somewhat to the gas cooler, which may be accounted by skewing or angling the door 14 by extending one cylider 72 of the pair more than the other.

The false door 14 is preferably formed of aluminum, and insulated. The necessary rubber seals extend around the door 14 periphery to form a substantially air tight seal with the container 12. Of course, hydraulic cylinders, valves, and a hydraulic pump could be used in place of the pneumatic valves, cylinders 72 and 74, and pneumatic compressor 68.

Although in the preferred embodiment air is used as the gas recirculated through the container and gas cooler apparatus, it will be understood that almost any desired gas may be employed. In particular, it may be desirable to use an alcove structure, similar to the alcove 40, around the false door 14 to seal the system from outside air when using nitrogen gas instead of air, as described in the patents and applications cited above in the description of the prior art section.

I prefer to use the pallets disclosed in U.S. Pat. No. 4,467,612, owned by Nhy-temp, Inc. to support boxes of vegetation loaded into the transport container.

Pallets 48, on which the cardboard boxes 50 of vegetation are stacked, form conduits from the front to the rear of the container (see FIGS. 3 and 4). The pallets 48 also have slits through the top thereof that facilitate evenly distributed air flow from the conduits to above the pallets 48. The pallets therefore, facilitate even distribution and dispersion of the flowed chilled gas or air through the pallet conduits from the rear to the front of the trailer.

The particular pallets 48 therefore insure that the vegetation at the front wall of the container opposite the rear opening, is cooled as well as that at the rear of the transport container near the opening. Thus it is desirable to make the inlet port in the false door 14 roughly associated with the pallet conduits so as to facilitate the high speed and high pressure flow of chilled air the length of the container 12 through the conduits formed by pallets 48.

The operation of the gas cooler 10 may be seen to occur as follows. As described previously, vegetation, such as green peppers, is harvested, quickly boxed in cardboard boxes, and loaded in the refrigeration transport container 12. The container 12 is quickly transported to the location of the gas coller 10 and hydrocooler 34 near the harvest site. The container 12 is backed up to the front of the gas cooler, with the opening of the transport container being positioned proximate and substantially aligned with and opposite the false door 14.

The true doors 16 are opened wide and the false door 14 is extended toward the opening by the operation of the appropriate pneumatic valves to extend the pneumatic cylinders 72. The pairs of cylinders 72 and 74 are operated to move the door vertically and horizontally into alignment with the opening in the container 12 rear. The cylinders 72 are then finally extended to seal the false door 14 in the opening of the container 12. Of course, the diesel motor 62 is running to power the compressor 66.

In preparation for operation, the hydrocooling unit 34 has been previously positioned so that the drain outlet 42 will discharge water into the water return trough 36 of the hydrocooling unit 34. The water supply pipe 38 of the hydrocooling unit 34 has also been previously connected to the water inlet 30 of the gas cooler 10.

The hydrocooling unit is started to chill water to 40° F., which, as discussed above, is about the USDA standard recommended storage temperature for green peppers. Selecting the water chill temperature as 40° F., insures that the desired container temperature will never go below 40° F. Although a lower water chill temperature might cool the container more quickly to 40° F., the vegetables within the container would be subject to an overly chilled air flow, which could cause damage. Thus, the water chill temperature is preferably not allowed to go below the standard recommended storage temperature of the vegetation commodity being cooled.

Twenty-two hundred gallons per minute (2,200 gpm) of the chilled water is preferably flowed through the water inlet 30 into the distribution pan 28. The chilled water then pours through the perforations in the distribution pan 28 evenly over the top of the surface media block 26. The water cascades in a multitude of tiny film layers, also referred to herein and in the claims as a water film or film of water, throughout the surface media block, providing extensive water surface area exposed to the air to be flowed through the block 26. As water drains from the block 26, it collects in to the drain 32 and it is flowed from the drain outlet 42 into the water return trough 36 of the hydrocooling unit 34.

Once the water is thoroughly distributed throughout the surface media, and film flow at steady state is established, the fan 58 is started by engaging it with the motor driveshaft 64, which is already in operation to power the compressor 66, as described above.

The fan 58 will generate air flow of about 25,000 cubic feet per minute. This will pressurize the fan duct, inlet plenum, flexible inlet duct, and the conduits running beneath the pallets along the floor of the interior of the container. The air will be evenly dispersed through the slits in the pallet tops, and forces up through the vegetation, absorbing heat from the vegetation (see FIGS. 3 and 4).

The heated air will then flow to the ceiling of the interior of the container 12 whereupon it will be withdrawn through the return port, flexible return duct 46, and return plenum 44 to the surface media block 26 where the heat absorbed from the vegetation is transferred to the cascading water in the surface media block 26. During the operation of the fan, the drift eliminator prevents droplets of water that will damage cardboard boxes from being carried by the forced air flow into the container. The chilled air is again forced by the fan beneath the pallets to again flow past the vegetation and further absorb heat therefrom. The rechilling and recirculation continues until the desired precooled or container temperature of the vegetation is obtained.

The embodiment shown and described above is only exemplary. I do not claim to have invented all the parts, elements, or steps described. Various modifications can be made in the construction, material, arrangement, and operation, and still be within the scope of my invention.

The limits of the invention and the bounds of the patent protection are measured by and defined in the following claims. The restrictive description and drawing of the specific example above do not point out what an infringement of this patent would be, but are to enable the reader to make and use the invention.

As an aid to correlating the terms of the claims to the exemplary drawing the following catalog of elements is provided:

Catalog of Elements 10 gas cooler
12 container
14 false door
16 true doors
18 frame
20 road wheels
22 fifth wheel
24 chamber
26 surface media block
27 rack
28 distribution pan
29 baffle
30 water inlet
32 drain
34 hydrocooling unit
36 water return trough
38 water supply pipe
39 water inlet (trailer)
40 alcove
42 drain outlet
44 return plenum
46 flexible return duct
48 pallets
50 cardboard boxes
52 inlet plenum
54 flexible inlet duct
56 fan duct
58 fan
60 fan shroud
62 diesel motor
64 driveshaft
66 compressor
68 fuel tank
69 stairs
70 drift eliminator
71 front stand
72 pneumatic cylinders
73 cylinder stand
74 pneumatic cylinders
75 cross bar

I claim as my invention:

1. Structure for precooling vegetation in
a. a transport container having an opening therein providing access to an interior of the transport container,
b. a true door associated with the container for covering and sealing the opening during transport and storage,
c. container refrigeration means on the transport container for maintaining a desired container temperature within the transport container that is at least the standard recommended storage temperature for said vegetation;

WHEREIN THE IMPROVED STRUCTURE COMPRISES:
d. a frame having two ends,
e. a false door on one end of the frame that is shaped to cover and seal the opening of the container,
f. the false door movably mounted on the frame for vertical and horizontal movement,
g. a heat exchange chamber on the frame,
h. a return conduit fluidly connecting the heat exchange chamber to a return port in the false door,
i. a fan on the frame having an intake of the fan fluidly connected to the heat exchange chamber,
j. a fan conduit fluidly connecting an exhaust of the fan to an inlet port in the false door,
k. a block of surface media within the heat exchange chamber,
l. distribution means within the heat exchange chamber above the block of surface media for distributing water onto the block of surface media,
m. a water inlet on the heat exchange chamber for fluidly connecting the distribution means with
n. a source of chilled water outside the heat exchange chamber,
o. the chilled water from the source of chilled water being at a water chill temperature that is at least the desired container temperature,
p. said block of surface media providing structure for the dispersion of the chilled water from the distribution means in a film over extensive surface area within the block of surface media to enhance heat exchange between the flowed gas and the film of water within the block of surface media, and
q. a water drain at a bottom of the heat exchange chamber.

2. The invention as defined in claim 1 including all of the limitations a. through q. with the addition of the following limitation:
r. a drift eliminator between the block of surface media and the fan intake for removing water droplets from air flowed to the fan from the surface media.

3. The invention as defined in claim 1 including all of the limitations a. through q. with the addition of the following limitations:
r. the transport container having more than 2000 cubic feet of space therein,
s. the fan having a circulating capacity of about 25,000 cubic feet of gas per minute through the inlet port of the false door,
t. the block of surface media, distribution means water inlet and water drain each having a capacity for liquid flow therethrough of about 2200 gallons of water per minute.

4. The invention as defined in claim 3 including all of the limitations a. through t. with the addition of the following limitation:
u. the water chill temperature being about the desired container temperature.

5. Structure for precooling vegetation in
a. a transport container having an opening therein providing access to an interior of the transport container,
b. a true door associated with the container for covering and sealing the opening during transport and storage,
c. container refrigeration means on the transport container for maintaining a desired container temperature within the transport container that is at least the standard recommended storage temperature for said vegetation;

WHEREIN THE IMPROVED STRUCTURE FOR COMPRISES IN COMBINATION WITH THE TRANSPORT CONTAINER DEFINED ABOVE:
d. a frame having two ends, e. a false door on one end of the frame,
f. the transport container positioned with respect to the frame so that the opening of the transport container is opposite the false door,
g. extension means mounting the false door on the frame for moving the false door vertically and horizontally into alignment with the opening of the container,
h. a heat exchange chamber on the frame,
i. a return conduit fluidly connected to the heat exchange chamber and extending from the heat exchange chamber toward the false door,
j. a flexible return duct fluidly connecting the return conduit to the interior of the transport container through a return port in the false door,
k. a fan on the frame having an intake and exhaust,
l. a motor on the frame operatively connected to the fan,
m. a fan shroud fluidly connecting the intake of the fan to the heat exchange chamber,
n. a fan conduit fluidly connected to the exhaust of the fan and extending toward the false door,
o. a flexible inlet duct fluidly connecting the fan conduit to the interior of the transport container through an inlet port in the false door,
p. a block of surface media within the heat exchange chamber,
q. a source of chilled water outside the heat exchange chamber,
r. the chilled water from the source of chilled water being at a water chill temperature that is at least the desired container temperature,
s. distribution means within the heat exchange chamber above the block of surface media for distributing water onto the block of surface media,
t. a water inlet in the heat exchange chamber fluidly connecting the distribution means with the source of chilled water,
u. a water drain at a bottom of the heat exchange chamber,
v. the surface media providing structure for the dispersion of the chilled water from the distribution means in a film over extensive surface area within the block of surface media to enhance heat exchange between the film of water and gas flowed through the block of surface media.

6. The invention as defined in claim 5 including all of the limitations a. through v. with the addition of the following limitation:
w. a drift eliminator between the block of surface media and the intake of the fan for removing water droplets from gas flowed from the block of surface media.

7. The invention as defined in claim 5 including all of the limitations a. through v. with the addition of the following limitations:
w. said distribution means being in the form of a sprinkler pan within the heat exchange chamber above the block of surface media,
x. perforations in the sprinkler pan that are evenly spaced coextensive with a top of the surface media.

8. The invention as defined in claim 5 including all of the limitations a. through v. with the addition of the following limitations:
w. the water drain fluidly connected to the source of chilled water,
x. the source of chilled water providing means for rechilling the water from the water drain and for recirculation to about the water chill temperature the rechilled water to the water inlet.

9. The invention as defined in claim 5 including all of the limitations a. through v. with the addition of the following limitations:
w. the vegetation being supported by pallets on a floor of the interior of the transport container,
x. the pallets each having opposite ends and a top,
y. the pallets each having conduits below the top extending from end to end,
z. the pallets each having slits in the top for fluid communication between the conduits of the pallets and space above the top of the pallets,
aa. the pallets being disposed end to end on the floor of the interior of the transport container so that the conduits of the pallets form container conduits extending from the opening of the transport container to a wall of the transport container opposite the opening of the transport container,
bb. a ceiling of the interior of the transport container being spaced above the vegetation,
cc. the return port of the false door being at a top of the false door disposed at the ceiling of the interior of the transport container, and
dd. the inlet port of the false door being at a bottom of the false door disposed at the floor of the interior of the transport container.

10. The invention as defined in claim 5 including all of the limitations a. through v. with the addition of the following limitations:
w. the transport container enclosing a container volume,
x. the fan having a capacity sufficient to circulate a volume of gas about equal to the container volume at least every ten seconds.

11. The invention as defined in claim 5 including all of the limitations a. through v. with the addition of the following limitations:
w. the transport container enclosing a container volume,
x. the block of surface media, distribution means, water inlet and water drain having a liquid flow capacity of about one gallon per minute for each cubic foot of container volume.

12. The invention as defined in claim 5 including all of the limitations a. through v. with the addition of the following limitations:
w. the transport container enclosing a container volume of about 2000 cubic feet,
x. the fan having a gas circulating capacity of about 25,000 cubic feet of air per minute through the intake port,
y. the source of chilled water flowing about 2200 gallons of water per minute,
z. the block of surface media, distribution means, water inlet, and water drain each having a liquid flow capacity of about 2200 gallons of water per minute, and
aa. the surface media dispersing a film of water within the block of surface media over a surface area of about 20,000 square feet.

13. The invention as defined in claim 12 including all of the limitations a. through aa. with the addition of the following limitation:
bb. the water chill temperature water being about the desired container temperature.

14. A process involving
a. vegetation in a
b. transport container having an opening therein providing access to an interior of the transport container, c. true doors on the container for covering and sealing the opening during transport and storage, and d. container refrigeration means on the transport container for maintaining a desired container temperature within the transport container that is at least the standard recommended storage temperature for said vegetation;

WHEREIN THE IMPROVED METHOD FOR PRECOOLING SAID VEGETATION WITHIN SAID TRANSPORT CONTAINER COMPRISES THE STEPS OF:

e. opening the true doors and f. positioning the opening proximate a false door, then g. aligning the false door with the opening, h. extending the false door to cover the opening, i. sealing the opening with the false door, j. pumping chilled water, being at a water chill temperature at least the desired container temperature, from a source of the chilled water to a heat exchange chamber, k. sprinkling the chilled water onto surface media within the heat exchange chamber, l. cascading the chilled water in a film across extensive surface area within the surface media, m. draining the flowed water from the heat exchange chamber, n. withdrawing gas from the transport container through a return conduit into the heat exchange chamber, o. flowing the gas through the surface media, thereby p. exchanging heat between the gas and the film of chilled water cascading over the extensive surface area within the surface media, and q. saturating the gas with water vapor evaporated from the film of chilled water, r. moving chilled saturated gas from the surface media through a drift eliminator for removing water droplets from the chilled gas, s. fan forcing the chilled gas through a fan conduit into the transport container, t. circulating the chilled gas around the vegetation in the container, thereby u. transferring heat from the vegetation to the chilled gas while v. avoiding dehydration of the vegetation; and thereafter w. continuously performing the "pumping" step "j." through the avoiding step "v." until the temperature of the vegetation is reduced to about the desired container temperature.

15. The invention as defined in claim 14 including all of the limitations a. through w. with the addition of the following limitations:

x. the transport container having a container volume of about 2000 cubic feet, y. the chilled water flow through the heat exchange chamber being about 2200 gallons per minute, z. the water chill temperature being about the desired container temperature, aa. the gas flow through the fan conduit being about 25,000 cubic feet per minute.

16. The invention as defined in claim 14 including all of the limitations a. through w. with the addition of the following limitations:

x. directing the chilled gas fan forced into the transport container to below the vegetation through conduits formed by pallets supporting the vegetation, y. evenly distributing the chilled gas to the vegetation through slits in the pallets, thereby promoting even circulation during the circulating step "t.", and z. flowing gas from around the vegetation to the ceiling of the container for even withdrawal from the container during the withdrawing step "n.".

17. The invention as defined in claim 14 including all of the limitations a. through w. with the addition of the following limitation:

x. exchanging the gas within the transport container about every six seconds.

* * * * *